(12) United States Patent  (10) Patent No.: US 7,394,453 B2
Woolley et al.  (45) Date of Patent: Jul. 1, 2008

(54) METHOD FOR SCROLLING AND EDGE MOTION ON A TOUCHPAD

(75) Inventors: Richard Woolley, Orem, UT (US); Don T. Saxby, Tooele, UT (US); Chris Oshima, San Jose, CA (US); Vadim Klishko, Layton, UT (US)

(73) Assignee: Cirque Corporation, Salt Lake City, UT (US)

( * ) Notice: Subject to any disclaimer, the term of this patent is extended or adjusted under 35 U.S.C. 154(b) by 394 days.

(21) Appl. No.: 11/113,830

(22) Filed: Apr. 25, 2005

(65) Prior Publication Data

US 2006/0033721 A1  Feb. 16, 2006

Related U.S. Application Data

(60) Provisional application No. 60/565,280, filed on Apr. 23, 2004.

(51) Int. Cl.
*G06F 3/033* (2006.01)
(52) U.S. Cl. .......................... 345/157; 715/858; 715/857
(58) Field of Classification Search ......... 345/156–157, 345/163–173; 715/856–862
See application file for complete search history.

(56) References Cited

U.S. PATENT DOCUMENTS

| 5,327,161 | A |  | 7/1994 | Logan |
| 5,543,590 | A |  | 8/1996 | Gillespie et al. |
| 5,543,591 | A |  | 8/1996 | Gillespie et al. |
| 5,613,137 | A |  | 3/1997 | Bertram et al. |
| 5,748,185 | A |  | 5/1998 | Stephan et al. |
| 5,757,368 | A |  | 5/1998 | Gerpheide et al. |
| 5,821,930 | A |  | 10/1998 | Hansen |
| 5,880,411 | A |  | 3/1999 | Gillespie et al. |
| 5,880,590 | A |  | 3/1999 | Gillespie et al. |
| 5,943,052 | A | * | 8/1999 | Allen et al. .................. 715/787 |
| 5,995,083 | A |  | 11/1999 | Sato et al. |
| 6,043,809 | A | * | 3/2000 | Holehan ...................... 345/168 |
| 6,414,671 | B1 |  | 7/2002 | Gillespie et al. |
| 6,690,365 | B2 | * | 2/2004 | Hinckley et al. ............ 345/173 |

FOREIGN PATENT DOCUMENTS

JP  5-307436  11/1993

* cited by examiner

*Primary Examiner*—Alexander Eisen
*Assistant Examiner*—Christopher E Leiby
(74) *Attorney, Agent, or Firm*—Morriss O'Bryant Compagni

(57) ABSTRACT

A method of using capacitance-sensitive touchpad, wherein the touchpad includes a plurality of zones on a surface thereof, wherein detection of a finger within one of the plurality of zones determines a direction and a speed of scrolling within a window in a graphical user interface, and wherein detection of a finger within one of the plurality of zones determines a direction and a speed of movement of a cursor performing edge motion in the graphical user interface, thus making edge motion and scrolling dependent only upon a detected location of a finger within the plurality of zones, and not dependent upon detecting movement of the finger.

9 Claims, 9 Drawing Sheets

METHOD FOR SCROLLING AND EDGE MOTION ON A TOUCHPAD

CROSS REFERENCE TO RELATED APPLICATIONS

This document claims priority to, and incorporated by reference all of the subject matter included in the provisional patent application, having Ser. No. 60/565,280 and filed on Apr. 23, 2004

BACKGROUND OF THE INVENTION

1. Field of the Invention

This invention relates generally to touchpads. More specifically, the present invention is a method for creating a plurality of discrete zones or regions in a border region of a touchpad, wherein a scrolling zone and edge motion are both controlled by finger location, not finger motion, wherein placing a finger in specific zones is used to control speed of scrolling within a graphical window, and the angle of automatic edge motion of a cursor in a graphical user interface.

2. Description of Related Art

To understand the advantages and differences of the present invention as compared to the prior art, this document first examines the prior art of edge motion and of scrolling.

Beginning with edge motion, in U.S. Pat. No. 5,327,161, Logan teaches a touchpad having a form of edge motion. FIG. 1 is a diagram that illustrates the main concept of the patent. A finger moves along the surface of the touchpad 10 along the line indicated as 12, thereby controlling movement of a cursor on a graphical user interface. When the finger reaches a border region 14, the touchpad determines a direction of movement (indicated as dotted line 16) of the finger as it entered the border region. The user can stop movement of the finger in the border region 14, and the cursor will continue movement in the direction 16 determined by the touchpad 10 when the finger first entered the border region until the user removes the finger from the surface of the touchpad, or moves the finger out of the border region.

In U.S. Pat. No. 5,880,590, Gillespie et al. teaches a modification of the Logan method. Specifically, a fixed reference point 22 is established on the touchpad 20 as shown in FIG. 2. When the user moves a finger across the surface (as indicated by solid line 24) of the touchpad 20 and enters a border region 24, a vector is determined by the touchpad. However, instead of determining the vector relative to the direction of movement of the finger as it enters the border region as in Logan and indicated by dotted line 26, the vector is taken from the fixed reference point 22 and the location 28 where the finger enters the border region 24. In this example, the direction of movement of the cursor would thus be in the direction indicated by dotted line 30. It can be seen that while different from Logan, the direction of continued movement of the cursor is relatively more difficult for a user to determine until movement of the cursor actually begins because continued movement is no longer determined by the last known direction of movement of the finger. Thus, the '590 patent does not use the more intuitive direction of continued cursor movement as taught by Logan.

In U.S. Pat. No. 5,880,411, also issued to Gillespie et al., the '411 patent teaches still another method that is different from the Logan method and the method of the '590 patent. Specifically, the '411 patent teaches that a finger on a surface of a touchpad 40 enters a border region 42 as shown in FIG. 3. However, instead of determining any vector, a cursor will simply move in a direction that is orthogonal to the edge of the touchpad 40 as indicated by dotted line 44. In other words, the cursor in this example would move in a horizontal direction straight toward the right edge of a graphical display because the finger entered a right border region 42 of the touchpad 40. This method is known as orthogonal edge motion.

The '411 patent also teaches being able to modify the movement of the cursor. Consider the example of FIG. 4 where the cursor is moving in the direction indicated by dotted line 44 of FIG. 3. If the user's finger moves first in the direction indicated by arrow 48 in a vertical direction, the horizontal movement of the cursor continues, but now has added to it a vertical component that follows the motion of the user's finger. This horizontal and vertical movement is indicated as upwardly sloping segment 52 of the cursor movement. If the finger momentarily stops, the cursor movement levels out as indicated by level segment 54 of the cursor movement. When the finger moves in the direction and magnitude of arrow 50, the cursor movement follows downward sloping segment 56. The cursor movement follows level segment 58 when the finger stops vertical movement.

Some helpful observations about how the border regions operate in the '161, the '590, and the '411 patents are as follows. The '411 patent teaches that regardless of what vector the finger has when entering the border region, the cursor moves orthogonally relative to the border region that has bee entered. There is no other option but to move orthogonally. In addition, the '411 patent teaches that vertical movements of the cursor are controlled by determining a previous position of the finger in the border region, and a present position. This realization is important to understanding the differences between the prior art and the present invention.

FIG. 5 illustrates the concept that if the finger is at a first position 60 and moves to a second position 62 in a border region 64, corresponding movement of the cursor on the graphical display will be a vertical component of movement in the same direction. Critically, when the finger stops, the cursor will eliminate any vertical component of movement, but continue its horizontal movement. In other words, the vertical cursor movement is directly dependent upon movement in the vertical direction within the border region 64. This is because the '411 patent teaches that motion is the determining factor for adding a vertical component of cursor movement. In other words, the actual position or location of the finger in the border region is only important in being able to determine that movement is taking place. Accordingly, as long as movement is detected, cursor movement is modified.

The discussion above is focused on the issue of edge motion. In other words, edge motion addresses the issue of how cursor movement is modified when a finger enters a border region. In contrast, the following discussion is centered on the concept of scrolling. For the purposes of this patent, scrolling is defined as controlling horizontal or vertical movement within a window on a graphical user interface by receiving signals from a touchpad.

Scrolling is another element that exists in the prior art of touchpads. In U.S. Pat. No. 5,943,052 issued to Allen, the Allen patent teaches a scrolling region 70 on touchpad 68 as shown in FIG. 6. Vertical movement 72 within the scrolling region 70 results in scrolling within a graphical user window in a graphical user interface shown on a display screen. What is important to observe is that Allen teaches that a data packet processor generates messages in response to "object motion." Object motion is apparently not dependent upon the location or position of a finger in the scrolling region 70. Instead, object motion is again dependent upon simply determining that motion is taking place, and then causing corresponding vertical (or horizontal) movement of the contents of the window.

It is important to understand the implications of this limitation of Allen. First, if movement of the finger causes scrolling action to occur, terminating movement of the finger likewise requires that scrolling must stop. Second, scrolling is not location dependent. In other words, scrolling action is not determined by where the finger is located within the scrolling region, it is only dependent upon whether or not the finger is moving, and in which direction the finger is moving.

BRIEF SUMMARY OF THE INVENTION

It is an aspect of the present invention to provide a touchpad that utilizes absolute positions of a finger on a touchpad to control motion of a cursor.

It is another aspect to provide edge motion on a touchpad that is not based on motion of a finger within a border region.

It is another aspect to provide a touchpad that utilizes absolute positions of a finger on a touchpad to control scrolling in a window.

It is anther aspect to provide scrolling on a touchpad that is not based in motion of a finger within a scrolling region.

In a preferred embodiment, the present invention is a method of using capacitance-sensitive touchpad, wherein the touchpad includes a plurality of zones on a surface thereof, wherein detection of a finger within one of the plurality of zones determines a direction and a speed of scrolling within a window in a graphical user interface, and wherein detection of finger within one of the plurality of zones determines a direction and a speed of movement of a cursor performing edge motion in the graphical user interface, thus making edge motion and scrolling dependent only upon a detected location of a finger within the plurality of zones, and not movement of the finger.

These and other aspects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

In a first embodiment of the invention, there is shown a new method of using a capacitance-sensitive touchpad for providing signals for controlling various aspects of a graphical user interface that are not dependent upon motion of an object on the touchpad surface, but rather are simply dependent upon a detected location of the object. In other words, the present invention teaches away from the concept of relying on detected motion of an object on the touchpad surface to cause edge motion or scrolling in the graphical user interface.

A useful analogy when examining the principles of the present invention comes from thinking of the touchpad as including a border region that has a mechanical lever. The border region of the touchpad is used to determine a location of an object (typically a finger) on the touchpad surface, and the corresponding action for edge motion or scrolling. The action corresponds to which of the plurality of zones within the border region the finger is located. Thus, it does not matter how a finger reached a current location within the plurality of zones. All that does matter is which of the plurality of zones is being touched.

Figure 1:
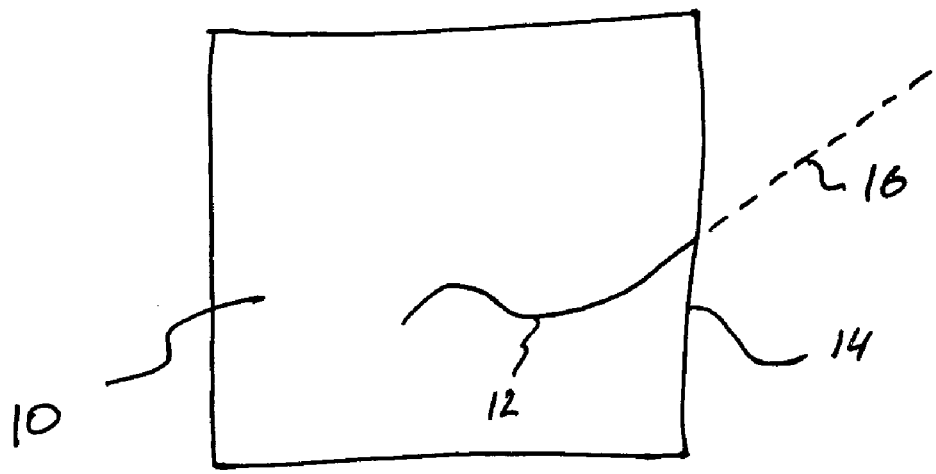
FIG. 1 is a representation of a touchpad surface showing movement of a finger along a surface thereof in the prior art that represents control of edge motion.
Figure 2:
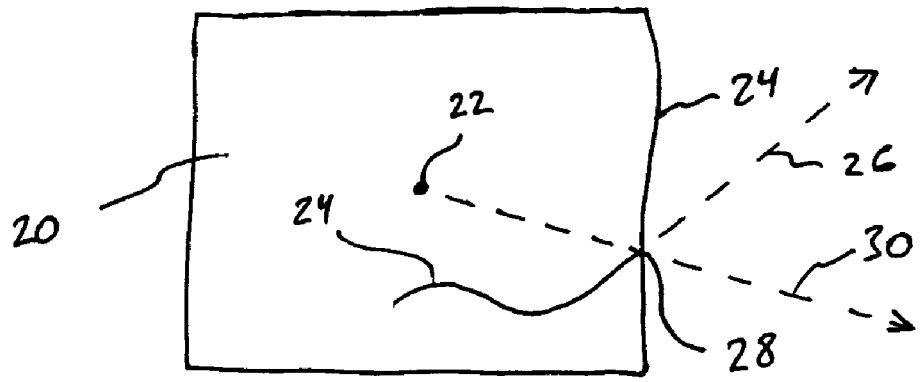
FIG. 2 is a representation of a touchpad surface showing movement of a finger along a surface thereof in the prior art that represents control of edge motion.
Figure 3:
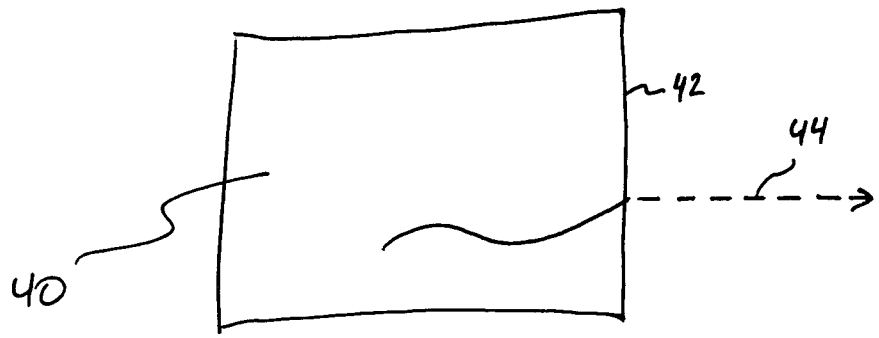
FIG. 3 is a representation of a touchpad surface showing movement of a finger along a surface thereof in the prior art that represents control of edge motion.
Figure 4:
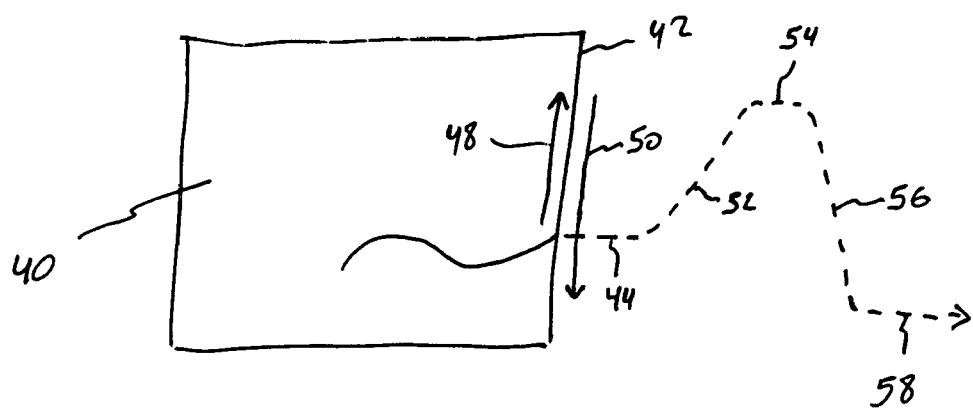
FIG. 4 is a representation of a touchpad surface showing movement of a finger along a surface thereof in the prior art that represents control of edge motion.
Figure 5:
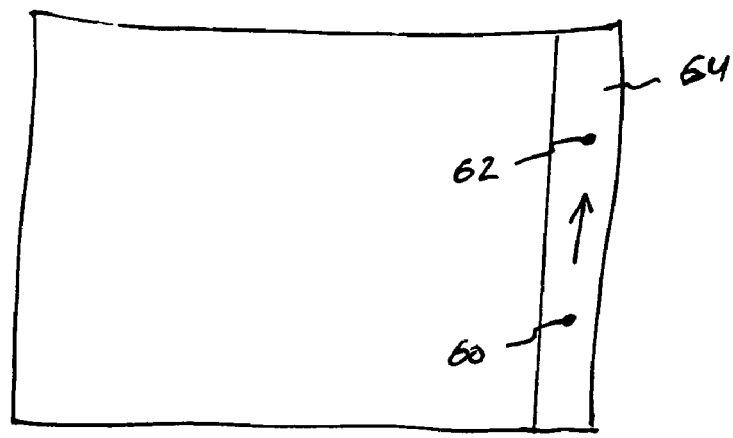
FIG. 5 is a representation of a touchpad surface showing movement of a finger along a surface thereof in the prior art that represents control of edge motion.
Figure 6:
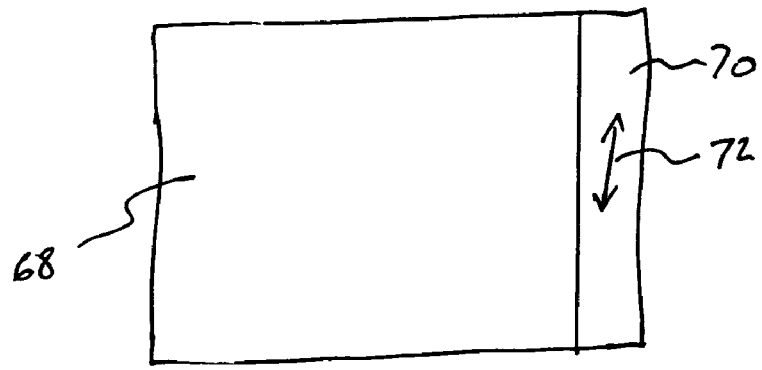
FIG. 6 is a representation of a touchpad surface showing movement of a finger along a surface thereof in the prior art that represents control of scrolling.
Figure 7:
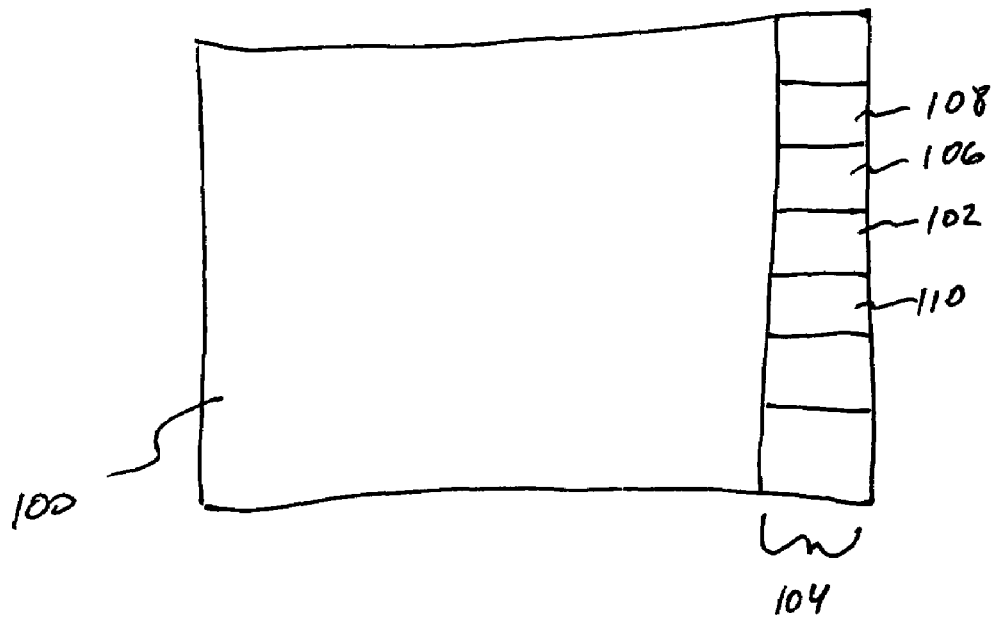
FIG. 7 is an illustration of a touchpad surface that illustrates finger movement along a surface thereof that represents an embodiment for controlling scrolling in the present invention.

The analogy to a lever is raised in FIG. 7 by considering a center zone 102 of the plurality of zones within a border region 104 of the touchpad 100. The actual number of zones within the border region 104 is not critical. The number of zones can be increased or decreased as desired because they are only defined in firmware or software. What is important is that a zone be selected as a beginning or center zone, even if that zone is not actually centered vertically within the border region 104. However, for the present example, the center zone 102 is approximately centered vertically within the border region 104.

The lever analogy addresses the issue of how far the user places a finger from the designed center zone 102. The greater the number of zones that the finger is detected away from the position of the center zone 102 corresponds to pressing harder on a lever and obtaining a corresponding larger or faster response from a mechanism begin controlled. Pressing harder or moving a centered stick from an upright position on a lever generally results in corresponding action from a controlled mechanism that is larger or faster than when the lever is not being moved as far from a centered position.

The same result is obtained when the finger is repositioned away from a center zone 102 in the border region 104. The center zone 102 can either be a predetermined or fixed position in the border region 104, or it can be determined by movement into the border region, depending upon the needs of the user. Thus, a zone that is actually centered vertically within the border region 104 can always be a fixed center zone 102. Alternatively, the "center zone" can be determined on the fly by designating whatever one of the plurality of zones is first entered into by a finger when entering the border region 104. This type of zone is defined as a "floating" center point or center zone. Either way, the operation of the scrolling or edge motion will be the same relative to whatever zone is designated as the center zone, whether it is actually centered or not.

Having determined which zone will now be designated as a center zone 102, it is now possible to examine operation of the touchpad in a scrolling mode or an edge motion mode.

Consider the touchpad 100 to be operating in a scrolling mode, wherein the position of the finger determines which direction scrolling of a window occurs, and the speed of scrolling. For example, assume that a finger has entered into the border region 104 causing the touchpad 100 to enter a scrolling mode. Alternatively, the scrolling mode can be activated in another way that is not dependent upon detecting the finger entering the border region 104.

Assume that the finger is detected within the center zone 102. The finger can move anywhere within the center zone 102 without causing any scrolling action to occur within the window. This is because the scrolling mode does not use movement of the finger to control scrolling functions. Instead, the touchpad waits to detect the presence of the finger within a different zone of the plurality of zones within the border region 104.

Assume that the finger is now detected in first zone 106. Because first zone 106 is located above the center zone 102, signals are sent from the touchpad that direct scrolling to occur in an upward direction in the window, and at a first pre-determined speed. Speed is not related to how fast a finger is moved from the center zone 102 to the first zone 106, but is determined by the proximity of the first zone to the center zone. Because the first zone 106 is adjacent to the center zone 102, the relative speed of the scrolling action will be slow.

However, if the finger is then detected in second zone 108, the direction of scrolling does not change, but the relative speed will be faster than the pre-determined scrolling speed of the first zone 106.

If the finger is detected in the third zone 110, then the direction of scrolling will change because the third zone is below the center zone 102. The speed of scrolling will be the same speed as the first zone 106. Thus, the farther that the finger is detected from the center zone, but still in the border region 104, the faster the scrolling action will be, with the direction of scrolling determined by the relative position of the finger with respect to the center zone, either above or below.

It should be recognized that the description given above is also relevant for horizontal scrolling if a horizontal border region is provided.

Movement of the finger from one zone to another in the border region 104 can be performed in two different ways. Obviously, the prior art required constant contact between the finger and the touchpad in order to use motion as the controlling input. However, the present invention does not care how the finger is moved because detection of motion is irrelevant. All that matters is in which of the plurality of zones the finger is detected. Thus, the finger can actually be raised off the touchpad surface and moved to another zone to cause scrolling or edge motion to occur or be modified, or the finger can slide on the touchpad surface from one zone to another. What is important to realize is that in this embodiment, the touchpad is not relying on detection of this movement of the finger, but only on a detected position of the finger. Thus, the finger can move or not move within a zone, and the corresponding scrolling or edge motion action will be the same. In contrast, the prior art would only function if movement on the touchpad is surface is detected, thus movement or not within a zone would result in two different actions.

Figure 8:
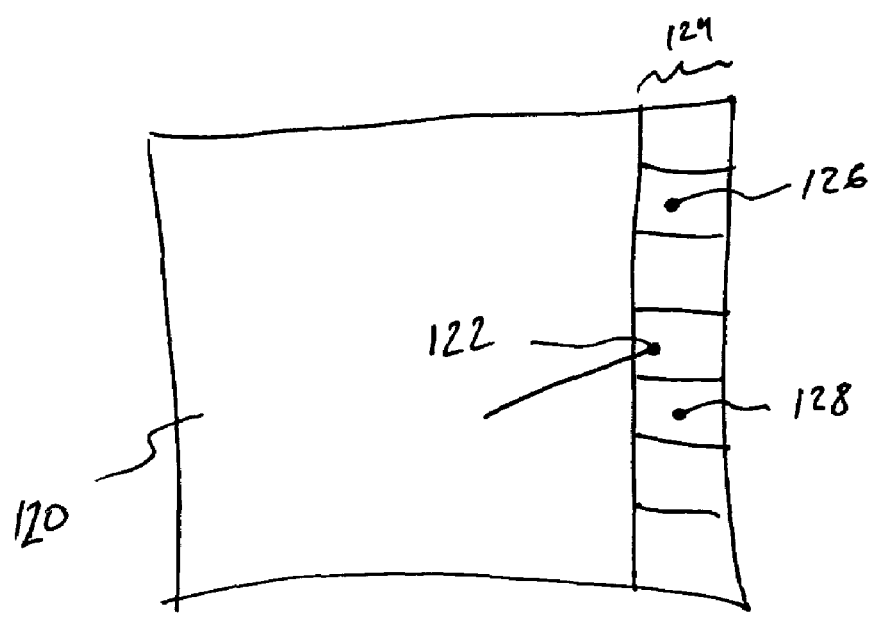
FIG. 8 is an illustration of a touchpad surface that illustrates finger movement along a surface thereof that represents an embodiment for controlling scrolling in the present invention.

Regarding edge motion, the lever principle works the same way. Specifically, motion in a vertical direction is controlled by detection of a finger in a particular zone. In FIG. 8, the finger is detected at position 122. Assume the touchpad 120 is either activated to be in an edge motion mode by movement into the border region 129, or it is activated by some other mechanism or method. Either way, it can be assumed that edge motion has been activated and a cursor is moving horizontally.

The user then changes the position of the finger to location 126 where it is detected. In a first embodiment, a vertical component is added to the horizontal motion of the cursor. The vertical component is constant at some predetermined rate of vertical movement. The vertical component is added to the cursor motion until the finger is removed from the zone wherein location 126 is positioned.

Figure 9:
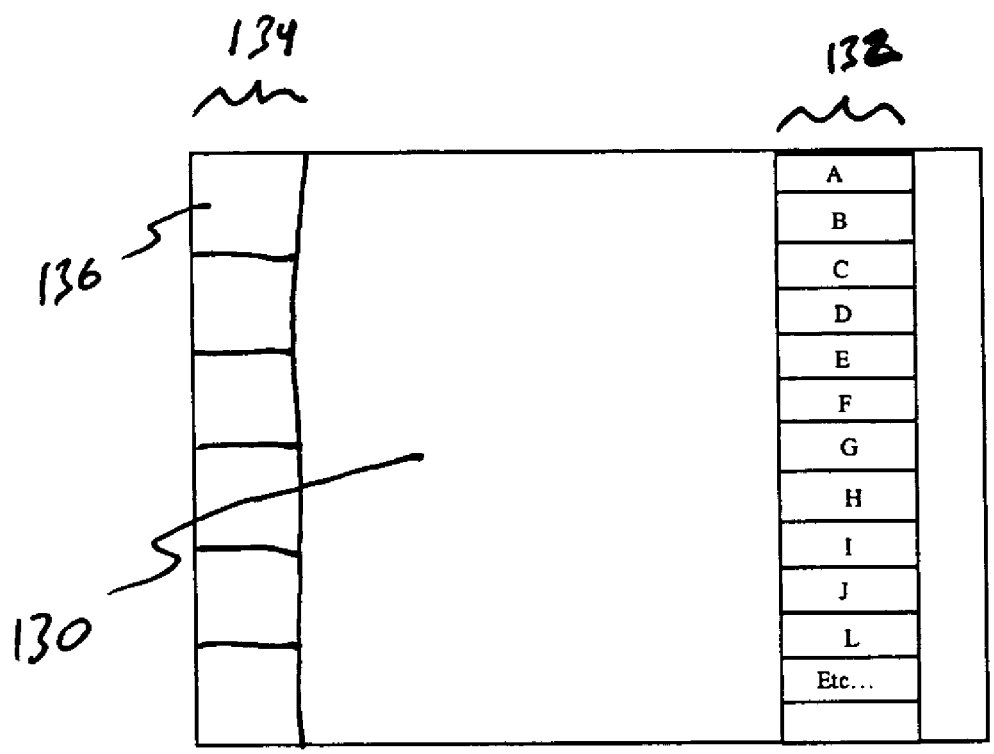
FIG. 9 is an illustration of a touchpad surface that illustrates finger movement along a surface thereof that represents an embodiment for controlling scrolling in the present invention.

FIG. 9 is an illustration of another embodiment of the lever action of the touchpad. An area 138 of the touchpad 130 is assigned to be a lever control area. The lever control area 138 consists of a series of discrete areas where each area outputs a data packet that can be used by a host driver or internal touchpad firmware to perform certain commands.

An example of the "lever control" could be as follows. Have the right vertical section 138 of a touchpad (such as a typical touchpad that ships with notebook computers), or touchpad strips assigned to be the lever control area. This vertical area 138 could be segmented into multiple segments or zones (as shown as A through L).

There are various ways to use the lever. As the user touches in a specific segment of the lever, the lever "moves" or the data packets of that zone are translated to perform an action. This action could be a multiplicity of actions such as volume control, scrolling, zooming, brightness settings, etc. Let's assume the user first puts the finger down in zone G. The finger should be placed for a predetermined time on the initial touchdown. This action will continue to be performed as long as the finger continues to remain in the zone (this should be the case if there was an initial touchdown in that zone as opposed to gliding over to the zone from the main cursoring area of the touchpad, in this case, no action occurs and the lever area is treated as normal cursor control area). The following are examples of different actions that can take place using the touchpad 130 of the embodiment of FIG. 9.

a. If the user moves the finger from one zone to another, such as zone G to zone F, it is similar to adjusting the position of the lever and the action assigned to the next zone is performed.

b. If the user moves the finger to the next zone, such as from F to E, the next action will occur.

c. If the user moves the finger to the previous zone, such as from E to F, then the action assigned to zone F will occur (similar to moving the lever back).

d. If the user lifts the finger from the pad, all action will cease (such as a lever snapping back to an "off" position).

Similar to the example above except with certain assigned functions to the lever, the lever may begin at a neutral state upon the first touchdown in any of the segments or zones. It could be that the user would like to scroll at a certain speed but does not place the finger at the correct lever setting or segment. Therefore the first placement would be a predetermined action regardless of the initial touchdown location in the lever area. The user may place the finger in the D segment where typically the predetermined assignment such as "no action" for scrolling would be located in the middle of the lever area such as at G. In this case, no action would still occur. Where typically the first "up" setting on the lever would be next to the G at F, if the user initially places the finger at D, then the next setting "up" of the lever would be C. The same would be the case for the reverse direction on the lever.

In an alternative embodiment, the vertical component is added for a predetermined length of time, and discontinues after that time has been reached. Likewise, detection of the finger at location 128 (see FIG. 8) causes a downward vertical component to be added to the cursor motion.

It should be noted that the touchpad operates in a manner similar to when scrolling is activated. For example, the center can be predetermined, or set by entering into the border region 124. Placing the finger in different zones might change the rate of the vertical component being added to cursor motion.

In another embodiment, movement into a corner zone 136 of the border region 134 may cause a cursor on a display screen to automatically have a vertical component of movement along with its horizontal component. Again, what is important is that adding a vertical (or horizontal) component to edge motion depends upon which zone of the plurality of zones the presence of the finger is detected. Pre-determined modifications to the vertical component are then added or removed depending upon where the finger is detected, and not upon detection of the motion between the plurality of zones.

The embodiments above envision a center point that is static, or that is determined once a finger enters a border edge motion or scrolling region. In another alternative embodiment shown in FIG. 10, the center point is dynamic. In other words, a finger enters the border region 150 in zone 152. If the finger moves to zone 154, scrolling action is initiated at a first speed in a first initial direction (upwards in this example). Assume the finger moves to zone 156. The scrolling action is then performed faster than the first speed at a second speed. In the embodiments above, moving back to zone 152 would only cause scrolling action to take place at the first speed. However, in this embodiment, the center point at which no scrolling action takes place has moved relative to the finger. For example, the center point is assigned to be in the zone immediately adjacent to the zone in which the finger is presently disposed. The center point thus follows the finger as it moves. In this case, the scrolling action would stop because the new "floating" center zone is now zone 154.

Of course, the movement of the center zone works in both directions. If the finger moves to zone 152, the scrolling action takes place at the first speed, and in an opposite direction as compared to the initial scrolling direction. Moving to zone 158 would then cause the scrolling action to take place at the second speed. However, if the finger were to instead be moved to zone 154 from zone 152, the scrolling action would stop because the new floating center point is now zone 154.

Figure 10:
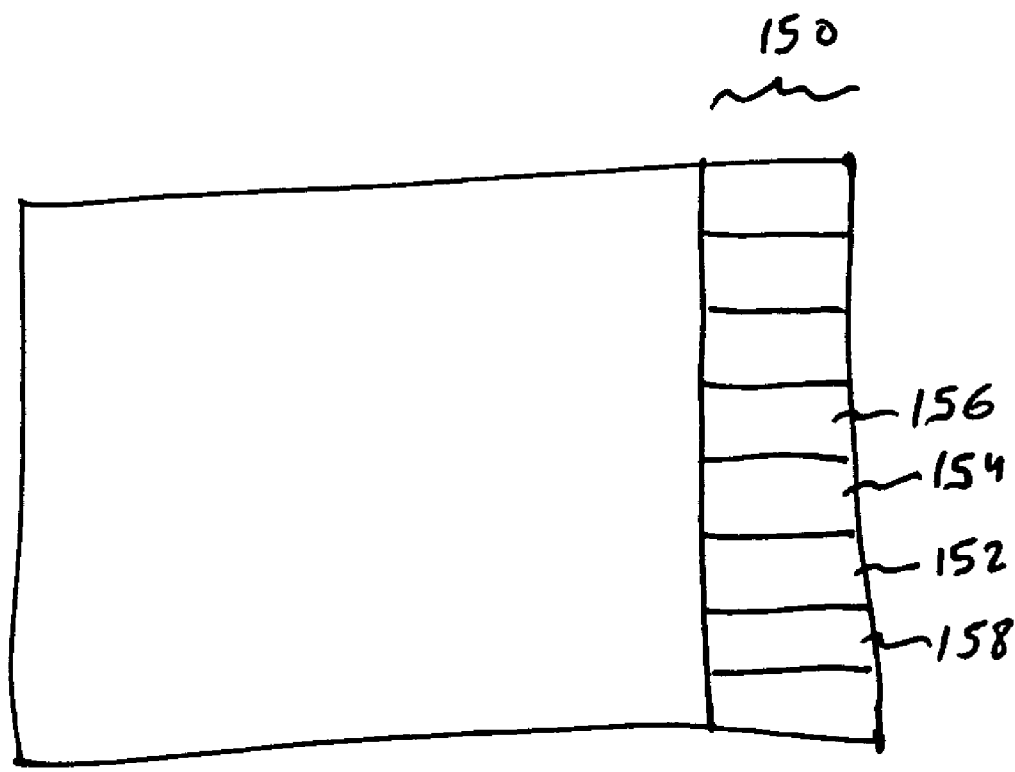
FIG. 10 is an illustration of a touchpad surface that illustrates finger movement along a surface thereof that represents an embodiment for controlling scrolling in the present invention.

Thus, in this embodiment in FIG. 10, a floating center point is established to be the zone directly behind the current zone, relative to the direction of movement of the finger. If the finger is being disposed in zones "up" the border region 150, the floating center point is always the zone directly below the current zone. Likewise, if the finger is being disposed in zones "down" the border region 150, the floating center point is always the zone directly above the current zone.

This alternative embodiment shown in FIG. 10 can be modified. For example, the floating center point can be established as the zone that is two, three, four, or any number of zones "behind" the current direction of movement.

It is noted that the floating center point may not move until the finger has been moved a sufficient number of zones away from the initial floating center point. For example, in a first embodiment, if the floating center point is three zones, then the finger must move at least four zones away from the initial floating center point for the floating center point to actually move.

In an alternative embodiment, the floating center point could be established as being three zones away after movement to a first zone away from the initial floating center point.

There are advantages to having a floating center point. One advantage is that it is possible to slow down or stop faster than with a static center point. For example, if the initial center point is ten zones below the current zone occupied by the finger, the finger would have to move back ten zones to stop scrolling action in the previous embodiments. In contrast, if the center point is now a floating center point that is assigned a value of two zones behind a current zone, then the finger would only have to move two zones to stop the scrolling action. Thus, another advantage of a floating center point is that the user can stop and/or begin scrolling in an opposite direction by moving a fewer total number of zones.

In another alternative embodiment, the vertical size of the zones can be altered. For example, the size of zones may be different with respect to each other. The center point zone in which no scrolling action takes place may be relatively large vertically when compared with zones that will cause scrolling action to take place. Likewise, the center point zone might be made to be smaller vertically with respect to zones that cause scrolling action.

In another embodiment, the size of the zones might be made dynamic. For example, an initial floating center point zone might be relatively small, but could be made to be a larger zone as it moves dynamically.

Figure 11:
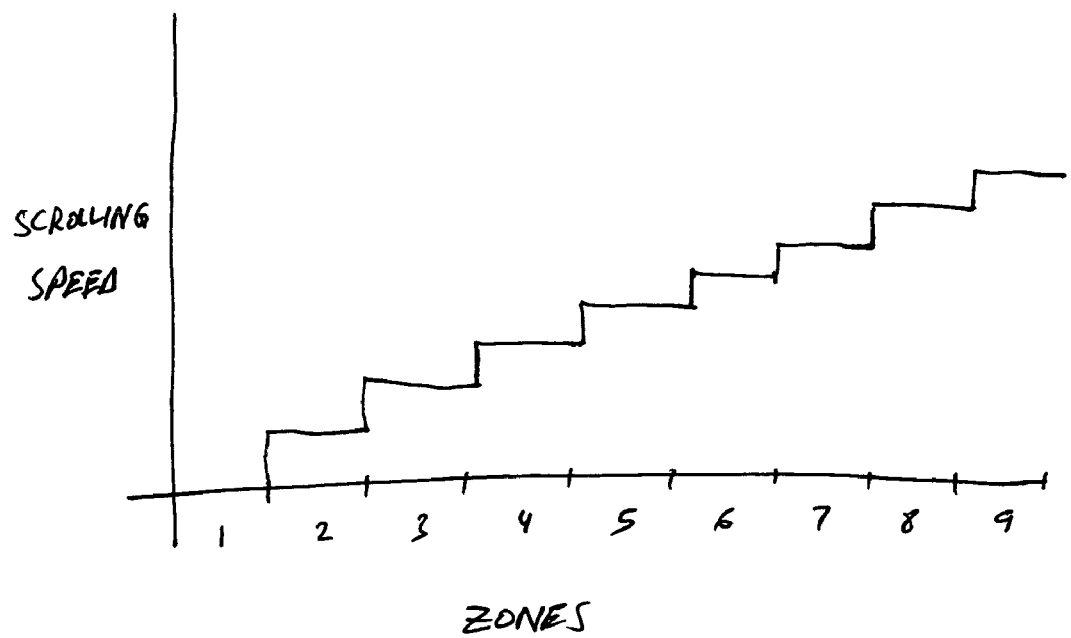
FIG. 11 is a graph showing a constant step-wise scrolling rate for an embodiment of the present invention.

In another alternative embodiment of the invention, the rate of change in speed of scrolling action is not linear. For example, the embodiments above will be assumed to teach scrolling speeds that change in a linear manner. Moving a finger from one zone to the next in a same direction causes an increase in the speed of scrolling in a stepwise manner, where the rate of change is constant from one zone to the next as shown in FIG. 11. In contrast, in this alternative embodiment, the rate of change could be determined to be as shown in FIG. 12.

For example, FIG. 11 shows linearly adjacent zones numbered 1 through 9 in the x-axis, and scrolling speed on the y-axis. As the finger is determined to be disposed in zones 1 through 9, the scrolling speed increases in a linear and stepwise fashion. In other words, the increase in the rate of scrolling increases the same when the finger moves from zone 2 to 3, and from 7 to 8.

Figure 12:
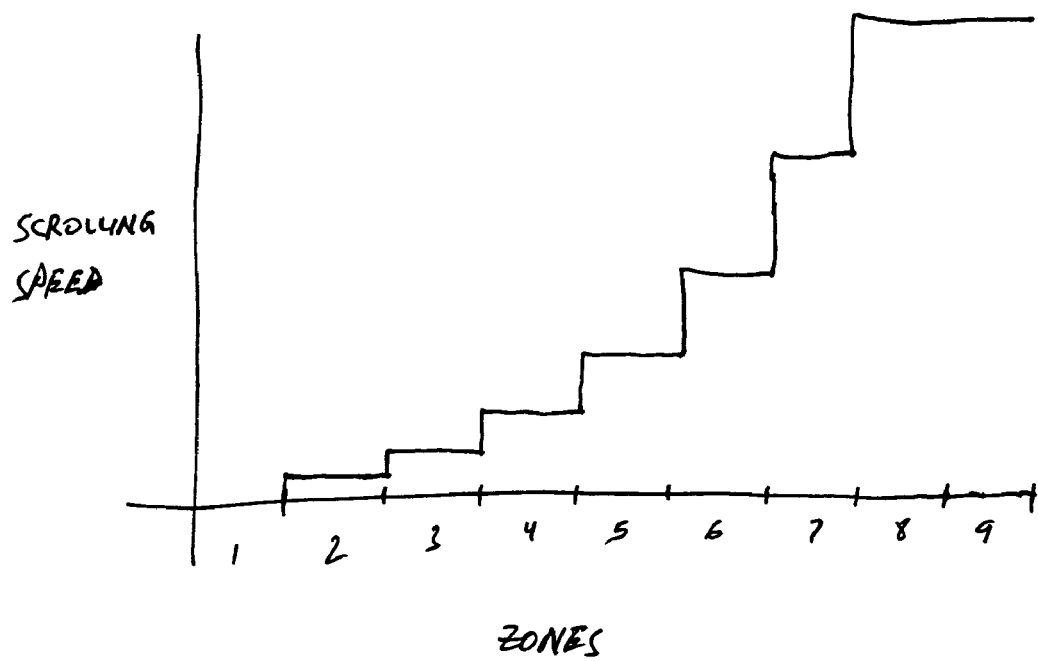
FIG. 12 is a graph showing an n increasing step-wise scrolling rate for an embodiment of the present invention.

In contrast, FIG. 12 shows that the rate of scrolling changes as the finger is found to be farther from the initial center point zone 1. Initially, the scrolling rate is relatively small. The scrolling rate increases with respect to the distance that the finger moves away from the initial center point zone 1. However, FIG. 12 also shows that a plateau is reached where the scrolling rate no longer increases with respect to the distance that the finger moves away from the initial center point zone 1.

Figure 13:
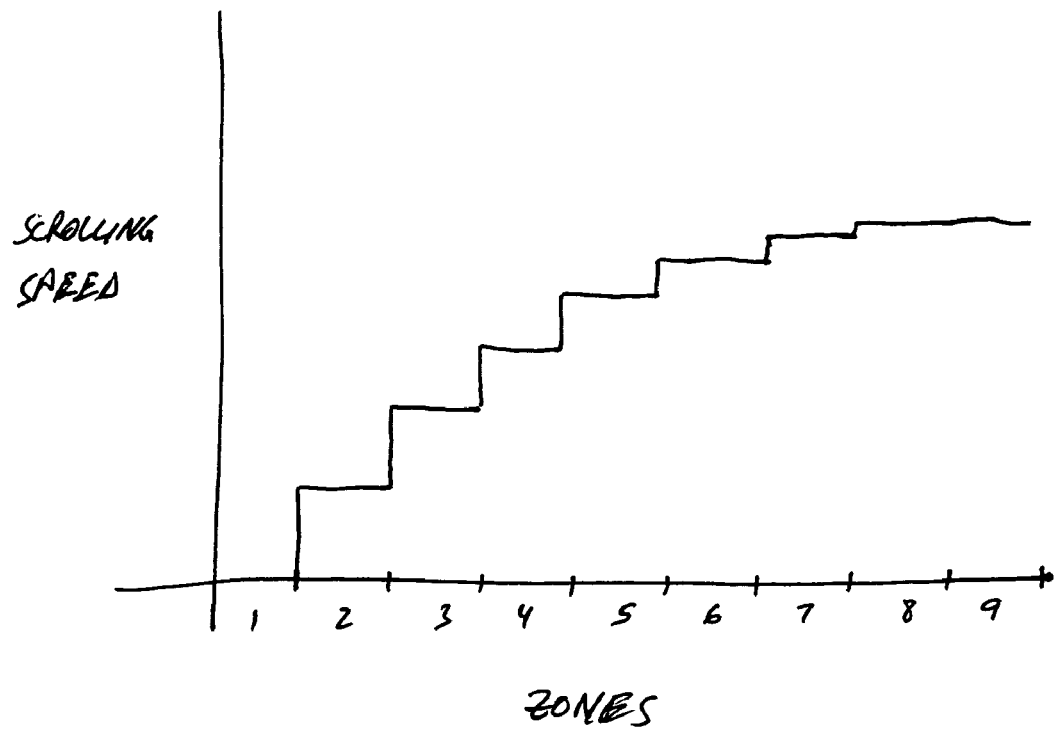
FIG. 13 is a graph showing a decreasing step-wise scrolling rate for an embodiment of the present invention.

It should be obvious that the chosen scrolling rates shown in FIG. 12 can be modified to create any desired scheme. For example, the scrolling rate could change as shown in FIG. 13. In FIG. 13, the scrolling rate changes are initially very large. However, as the finger moves away from the initial center point zone 1, the rate of change in scrolling speed decreases.

It is an aspect of these embodiments that the change in scrolling rates will change for scrolling in either direction.

In another aspect of the present invention, it is envisioned that while a touchpad is the primary device in which the present invention is implemented, any cursor-control device can take advantage of the present invention. Furthermore, the touchpad may be a dedicated scrolling device having only a dedicated scrolling region, without any cursor-control capabilities.

It is another aspect of the present invention that the touchpad transmits data representing the position of the finger or other pointing object. The data is used by an application that controls scrolling in a window on a graphical display.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for controlling scrolling in a window shown on a graphical display when using a scrolling zone on a touchpad, said method comprising the steps of:
   providing a touchpad which includes a scrolling zone having a plurality of zones, wherein the touchpad transmits data packets representing a position of a pointing object on the touchpad;
   making contact in the scrolling zone with the pointing object at an initial point of contact, and wherein a scrolling mode is active;
   moving the pointing object from zone to zone in the scrolling zone in an initial direction to thereby cause a scrolling action in a window in a graphical display, wherein a rate of scrolling is determined by how far the pointing object is moved from the initial point of contact;
   establishing a floating center point that moves from zone to zone, wherein the floating center point trails behind the pointing object as it moves in the initial direction, and wherein the floating center point is always a predetermined number of zones behind the pointing object when moving in the initial direction; and
   causing the floating center point to remain in a current zone if the pointing object stops moving in the initial direction or begins moving in an alternate direction that is opposite the initial direction;
   stopping the scrolling action when the pointing object stops or moves in the alternate direction until making contact with the current zone that is defined as a current location of the floating center point.

2. The method as defined in claim 1 wherein the method further comprises the step of reestablishing the floating center point whenever the pointing object makes contact with the floating center point and then begins to move again in a new initial direction, wherein the floating center point will again trail behind the pointing object after the pointing object moves in the new initial direction, and wherein the floating center point is always a predetermined number of zones behind the pointing object when moving, unless the pointing object is moved in a direction opposite the new initial direction in order to stop the scrolling action.

3. The method as defined in claim 1 wherein the method comprises the step of always keeping the floating center point near the current position of the pointing object so that the scrolling action can be rapidly stopped by reversing direction of the pointing object and moving the predetermined number of zones to the current position of the floating center point.

4. The method as defined in claim 1 wherein the method further comprises the step of activating the scrolling mode, wherein the scrolling mode is activated by sliding the pointing object into the scrolling zone.

5. The method as defined in claim 1 wherein the method further comprises the step of activating the scrolling mode, wherein the scrolling mode is activated by the pointing object making touchdown within the scrolling zone.

6. The method as defined in claim 1 wherein the method further comprises the step of sliding the pointing object from zone to zone to thereby cause the scrolling action.

7. The method as defined in claim 1 wherein the method further comprises the step of lifting the pointing object off the touchpad and then placing the pointing object back down on the touchpad in a different zone in order to move in the scrolling zone.

8. The method as defined in claim 7 wherein the method further comprises the step of activating the scrolling mode, wherein the scrolling mode is activated by sliding the pointing object into the scrolling zone.

9. The method as defined in claim 7 wherein the method further comprises the step of activating the scrolling mode, wherein the scrolling mode is activated by the pointing object making touchdown within the scrolling zone.

* * * * *